Dec. 19, 1967     C. E. MAILLEFER     3,358,327
SCREW FOR EXTRUSION APPARATUS
Filed Dec. 20, 1960
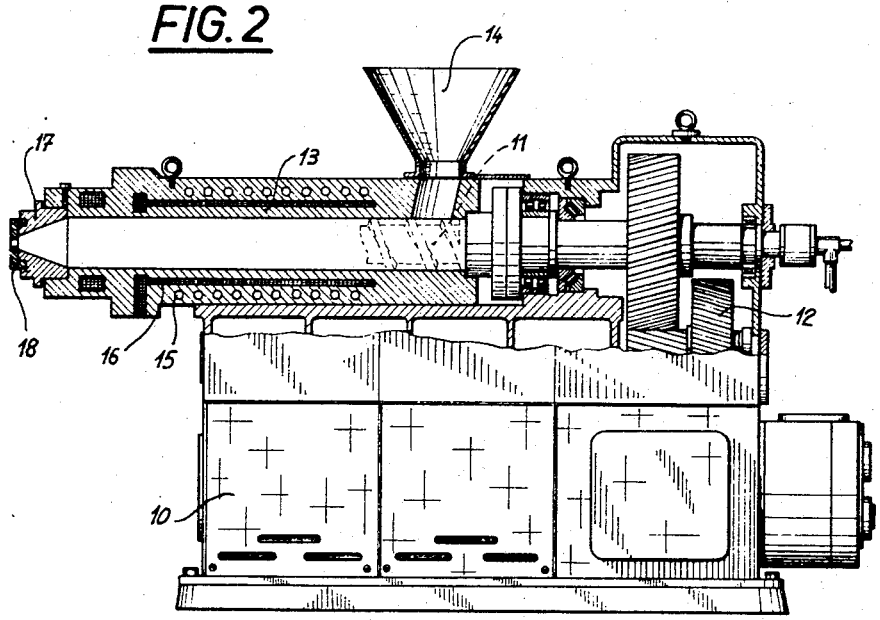
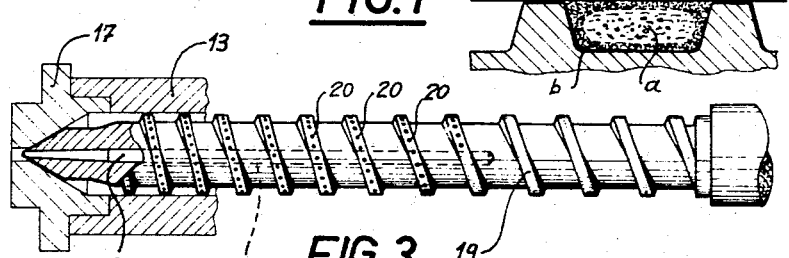
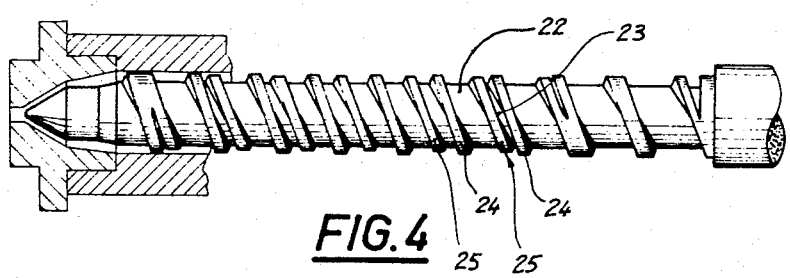
INVENTOR
Charles E. MAILLEFER United States Patent Office 3,358,327
Patented Dec. 19, 1967

3,358,327
SCREW FOR EXTRUSION APPARATUS
Charles E. Maillefer, Renens, Switzerland, assignor to Maillefer S.A., Renens, Switzerland
Filed Dec. 20, 1960, Ser. No. 77,117
Claims priority, application Switzerland, Dec. 3, 1959, 82,535/59
2 Claims. (Cl. 18—12)

Examination of the operation of machines such as trace presses leads to problems which are far from being completely solved. This is ascribable to the complexity of the phenomena and of the number of parameters involved in the operation of such machines.

The investigations made have however allowed the development of a few general principles which have been confirmed by experience. However, even today, trace presses are generally executed on more or less empirical bases. The performances of said machines cannot, under such conditions, reach very high levels.

The low yields of conventional trace presses are ascribable to the fact that the solid material does not melt in a uniform manner, in contradistinction with the generally admitted hypotheses and, in fact, on a comparatively long section of the conveyor screw, the material shows both solid and viscous parts.

In the accompanying drawings:

FIG. 1 shows the distribution of two phases in a cross-section of the strip of the material. The central part $a$ of said strip, which is comparatively well insulated from a thermal standpoint, forms a core which remains solid, while its periphery $b$ in which the material is heated speedily through frictional contact with the conveyor screw and the cylinder, is already viscous (for instance in the case of polystyrol or polyvinyles) or even liquid (for instance in the case of polyamides).

This phase duality is all the more important when the screw rotates at a higher speed, since the heat evolved is then higher and the time during which said heat may be distributed throughout the strip of material is shorter.

The juxtaposition of said two phases, of which one prevents the transformation of the other, forms one of the main causes of the impossibility of increasing the output of trace presses above comparatively low values.

The present invention has for its object a conveyor screw, chiefly for trace presses or extrusion apparatus, wherein the consequences of the subdivision of the material into two phases, do not appear anymore, which allows improving considerably the yield of conventional trace presses.

The improved conveyor screw includes means for separating along the screw the viscous or fluent phase from the solid phase of the material treated, as the melting proceeds.

The accompanying drawings illustrate, by way of example two embodiments of the object of the invention.

In said drawing:

FIG. 1 is an explanatory diagram already referred to.

FIG. 2 is a vertical partial sectional view of a trace press after removal of the conveyor screw.

FIG. 3 is a view on a larger scale of the actual screw.

FIG. 4 is a view similar to FIG. 3, of a second embodiment of the screw.

The two embodiments of the screw are applicable to the same trace press or extrusion press or apparatus illustrated in FIG. 4.

In FIG. 2, 10 designates the frame of the machine, 11 the screw, 12 the speed reducing gear, 13 the cylinder in which the conveyor screw revolves, 14 the filling hopper, 15 the cooling worm, 16 the heating means, 17 the extruding head and 18 the outlet die.

The conveyor screw shown in FIG. 3 has a single thread 19 defining a groove, the transverse size of which decreases gradually from the opening of the hopper 14 towards the extruding head 17. Starting from the area in which the treated material begins melting, the surface of the thread 19 in contact with the inner wall of the cylinder 13 is provided with perforations 20 which communicate with a channel 21 extending axially of the screw for collecting the molten material. Said channel 21 is closed at its upstream end and opens at its downstream end into the port of the head 17. The conical tip of the screw is applied fluid tightly against a cooperating surface of said head.

Under such conditions, the outer viscous or fluent phase of the material treated is urged as the melting progresses, through the perforations 20 and it is collected by the channel 21 along which it flows towards the die 18. The solid phase, which is continuously separated from its viscous coat, is thus rapidly brought to melting, which allows imparting to the screw rotary speeds and obtaining outputs which are much higher than in conventional trace presses.

The second embodiment differs from the first one through the fact that the conveyor screw (FIG. 4) is provided with two grooves 22 and 23 arranged in side by side relationship and of which the transverse sizes decrease in opposite directions down to a zero value.

The diameter of the thread 24 limiting on the downstream or tip side the groove 22 and on the upstream or remote from the tip side the groove 23 is slightly larger than that of the thread 25, which limits on the upstream side the groove 22 and the downstream side the groove 23, whereby there is provided longitudinally of the screw between said grooves a continuous passageway through which the viscous phase is urged as the melting proceeds from the groove 22 into the groove 23.

The invention is obviously not limited to what is illustrated in the drawings. In particular, the means separating the two phases may be executed in an entirely different manner in the two cases considered. Similarly, the screw may be used in machines other than trace presses, for instance in injecting machines. Said screws may also be associated with one of the numerous well-known arrangements serving for the exhaust of the gases contained in the material which is being treated.

What is claimed is:

1. In an extruding machine, such as, the combination of a cylinder, having a cylinder wall terminating with an extrusion port, a conveyor screw, having a tip, provided with at least one thread defining a substantially helical groove and mounted for rotation in said cylinder with said tip facing said extrusion port, said screw being provided with an axial channel having a closed end and an open end with said open end opening at said screw tip and with a plurality of radial channels extending between said axial channel and the outer periphery of the screw thread, means for feeding material to be extruded into the screw groove, heating means mounted in said cylinder wall for melting the material as it progresses along the revolving screw inside the cylinder, the material, as it is heated in contact with the inner surface of the cylinder, melting and flowing into the radial channels and thence into the axial channel of the screw towards the tip of the latter and into the extruding port of the cylinder.

2. An extrusion machine comprising a heated cylinder, a screw conveyor rotatably mounted in the bore of said cylinder, said screw conveyor being operable to move material to be extruded from one end of the cylinder to the other, an extruding head mounted on said other end of the cylinder, said head having an extrusion port therein, said screw conveyor having a tip adapted to complementarily fit with said extruding head to close said port, said screw conveyor further having a thread defining a substantially helical groove, said thread having a pitch decreasing along the length of said screw conveyor toward said tip and having an outer periphery smaller than the periphery of said bore, said screw conveyor further having an axial channel extending from an opening on said tip which communicates with said port to a blind end within said screw conveyor, said screw conveyor further having a plurality of channels extending radially thereof from the outer periphery of said thread to said axially extending bore.

References Cited

UNITED STATES PATENTS

| 1,886,592 | 11/1932 | Royle | 18—12 |
| 1,904,884 | 4/1933 | Royle | 18—125 |
| 2,680,880 | 6/1954 | Corbett | 18—30 |

FOREIGN PATENTS

| 215,146 | 10/1957 | Australia. |
| 1,133,446 | 3/1957 | France. |
| 649,187 | 8/1937 | Germany. |
| 860,261 | 12/1952 | Germany. |

WILLIAM J. STEPHENSON, *Primary Examiner.*

J. SPENCER OVERHOLSER, *Examiner.*

W. E. THOMSON, L. S. SQUIRES, *Assistant Examiners.*

UNITED STATES PATENT OFFICE
CERTIFICATE OF CORRECTION

Patent No. 3,358,327

December 19, 1967

Charles E. Maillefer

It is hereby certified that error appears in the above numbered patent requiring correction and that the said Letters Patent should read as corrected below.

Column 2, line 49, strike out "such as,".

Signed and sealed this 1st day of April 1969.

(SEAL)
Attest:

Edward M. Fletcher, Jr.
Attesting Officer

EDWARD J. BRENNER
Commissioner of Patents